United States Patent
Alig

(10) Patent No.: US 11,878,880 B2
(45) Date of Patent: Jan. 23, 2024

(54) SELF-ROTATING GRAIN SPREADER AND GRAIN MONITORING SYSTEM FOR A GRAIN BIN

(71) Applicant: David Dale Alig, Portland, IN (US)

(72) Inventor: David Dale Alig, Portland, IN (US)

(*) Notice: Subject to any disclaimer, the term of this patent is extended or adjusted under 35 U.S.C. 154(b) by 0 days.

(21) Appl. No.: 17/690,508

(22) Filed: Mar. 9, 2022

(65) Prior Publication Data

US 2022/0194722 A1 Jun. 23, 2022

Related U.S. Application Data

(63) Continuation-in-part of application No. 17/473,399, filed on Sep. 13, 2021, which is a continuation-in-part of application No. 29/725,851, filed on Feb. 27, 2020, now Pat. No. Des. 931,340.

(51) Int. Cl.
*B65G 69/04* (2006.01)
*B65G 69/20* (2006.01)

(52) U.S. Cl.
CPC ..... *B65G 69/0458* (2013.01); *B65G 69/0441* (2013.01); *B65G 69/20* (2013.01); *B65G 2814/027* (2013.01); *B65G 2814/0282* (2013.01)

(58) Field of Classification Search
CPC ............ B65G 69/0441; B65G 69/0458; B65G 69/20; B65G 2814/027; B65G 2814/0282
USPC ................................................ 414/299–302
See application file for complete search history.

(56) References Cited

U.S. PATENT DOCUMENTS

| 1,793,032 | A | | 2/1931 | Welker | |
|---|---|---|---|---|---|
| 3,156,541 | A | * | 11/1964 | Kalke | B65D 88/742 366/261 |
| 3,248,117 | A | * | 4/1966 | Donelson, Jr. | B65G 69/00 248/327 |
| 3,251,582 | A | * | 5/1966 | Murphy | F26B 9/085 366/261 |
| 3,445,091 | A | * | 5/1969 | Jackson | F26B 9/085 366/261 |
| 3,868,028 | A | | 2/1975 | Mausser | |
| 4,040,529 | A | | 8/1977 | Wurdeman et al. | |

(Continued)

OTHER PUBLICATIONS

Tri-State Grain Conditioning, Inc. "Grain Bin Temperature & Moisture Monitoring System." <https://www.tsgcinc.com>. Jan. 27, 2022 Admitted Prior Art.

(Continued)

*Primary Examiner* — James Keenan
(74) *Attorney, Agent, or Firm* — Jacox, Meckstroth & Jenkins

(57) ABSTRACT

A grain bin has a top opening with a hopper for receiving grain that is directed downwardly to a spreader supported for rotation by a vertical tubular center shaft. The spreader has an elongated inclined chute having a V-shape cross-section. The chute has a center portion having an opening with a trap door pivoted or controlled from a mechanism operable from the top opening of the bin. A deflector is positioned under the trap door opening and rotates the chute in response to the flow of grain through the opening. The tubular center shaft encloses an electrical cable that supports a temperature sensing element within the grain in the bin, and a temperature monitoring device is connected to the cable outside the grain bin.

3 Claims, 5 Drawing Sheets

(56) References Cited

U.S. PATENT DOCUMENTS

| | | | |
|---|---|---|---|
| 4,216,914 A * | 8/1980 | O'Hanlon | B65G 69/0458 406/162 |
| 4,272,028 A | 6/1981 | Cobb | |
| 4,555,210 A * | 11/1985 | Wigram | B65G 69/0458 414/301 |
| 4,611,965 A | 9/1986 | Dixon et al. | |
| 4,902,185 A | 2/1990 | Dixon et al. | |
| 5,020,701 A | 6/1991 | Donelson | |
| 5,372,467 A | 12/1994 | Harris | |
| 5,421,379 A * | 6/1995 | Geiser | B65G 69/0458 141/286 |
| 5,393,189 A | 12/1995 | Berquist | |
| 5,570,954 A | 11/1996 | Sukup | |
| 5,755,837 A * | 5/1998 | Beierle | C10B 53/02 414/205 |
| 6,591,972 B1 * | 7/2003 | Forrest | B65G 69/0441 193/29 |
| 6,991,415 B1 | 1/2006 | Anschultz | |
| 7,931,432 B2 | 4/2011 | Hershberger | |
| 7,946,796 B2 | 5/2011 | Halland et al. | |
| 9,015,958 B2 * | 4/2015 | Bloemendaal | F26B 25/002 34/174 |
| 10,889,455 B1 | 1/2021 | Agnew et al. | |
| 10,990,771 B2 | 4/2021 | Leafloor et al. | |
| 2004/0046071 A1 | 3/2004 | Shivvers | |
| 2006/0072989 A1 | 4/2006 | Kaeb et al. | |
| 2008/0219817 A1 | 9/2008 | Halland et al. | |
| 2009/0324372 A1 | 12/2009 | Hershberger | |
| 2010/0239399 A1 | 9/2010 | Hoogestraat et al. | |
| 2012/0205007 A1 * | 8/2012 | Girard | B01J 8/002 141/387 |
| 2014/0165854 A1 | 6/2014 | Green et al. | |
| 2015/0196883 A1 | 7/2015 | Jensen | |
| 2016/0038894 A1 | 2/2016 | Jensen et al. | |
| 2016/0330270 A1 * | 11/2016 | Folk | H04W 4/70 |
| 2018/0128356 A1 | 5/2018 | Koehler et al. | |
| 2019/0291980 A1 | 9/2019 | Honeck et al. | |
| 2020/0263923 A1 | 8/2020 | Bloemendaal | |
| 2020/0396903 A1 | 12/2020 | Kosior et al. | |
| 2021/0107752 A1 * | 4/2021 | Martin | B65G 69/0441 |

OTHER PUBLICATIONS

Safe-Grain, Inc./Maxi-Tronic, Inc. "Grain Temperature Monitoring Systems." <https://safegrain.com>. Jan. 27, 2022 Admitted Prior Art.

* cited by examiner

US 11,878,880 B2

SELF-ROTATING GRAIN SPREADER AND GRAIN MONITORING SYSTEM FOR A GRAIN BIN

RELATED APPLICATION

This application is a continuation-in-part of patent application Ser. No. 17/473,399, filed Sep. 13, 2021, which is a continuation-in-part of design patent application Ser. No. 29/725,851, filed Feb. 27, 2020 and claims the benefit of the disclosures and filing dates of the applications.

BACKGROUND OF THE INVENTION

The present invention relates to a self-rotating grain spreader for mounting with the upper portion of a grain bin having a top opening for receiving grain. The grain is commonly delivered to the top opening by an inclined power driven conveyor for distributing or spreading the grain over the entire area of the grain bin. The spreader may have one or more distributing chutes and supported for rotation by a vertical center shaft which supports the spreader for rotation within an upper portion of the grain bin. The chute is inclined downwardly and has deflectors which cause the spreader to rotate in response to the flow of grain from the top opening into the spreader, for example, as this disclosed in U.S. Pat. No. 7,931,432.

It is very desirable for the spreader to handle variable flow rates of grain into the top opening of the grain bin and to handle different types of grains and grains of different sizes and different moisture content. It is also desirable to control the rotation of the grain spreader in response to the flow of grain into the top opening of the grain bin in order to control the deposit or spreading of grain uniformly around the entire top surface of the grain within the bin. It is further desirable to monitor the temperature and moisture of the grain being deposited into the bin.

DESCRIPTION OF THE PREFERRED EMBODIMENT

Figure 1:
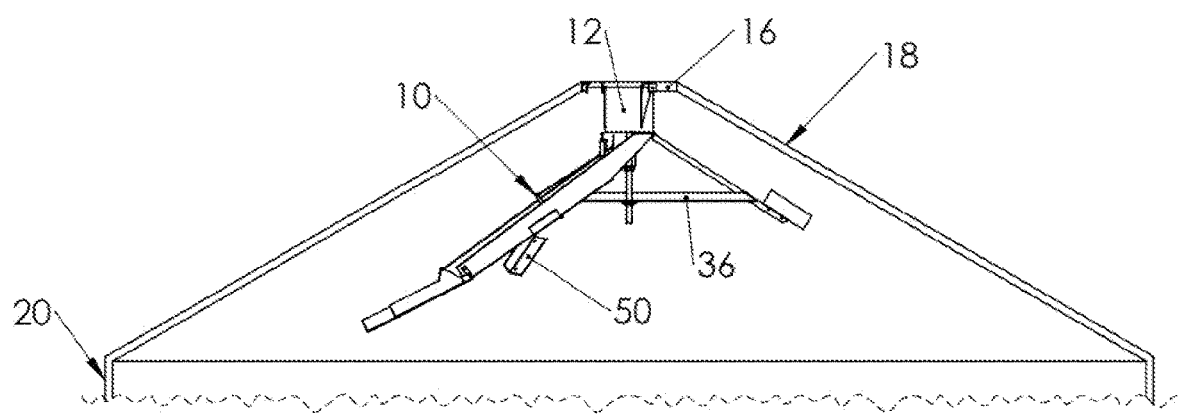
FIG. 1 is an elevational side view of a self-rotating grain spreader for a grain bin and constructed in accordance with the invention.
Figure 2:
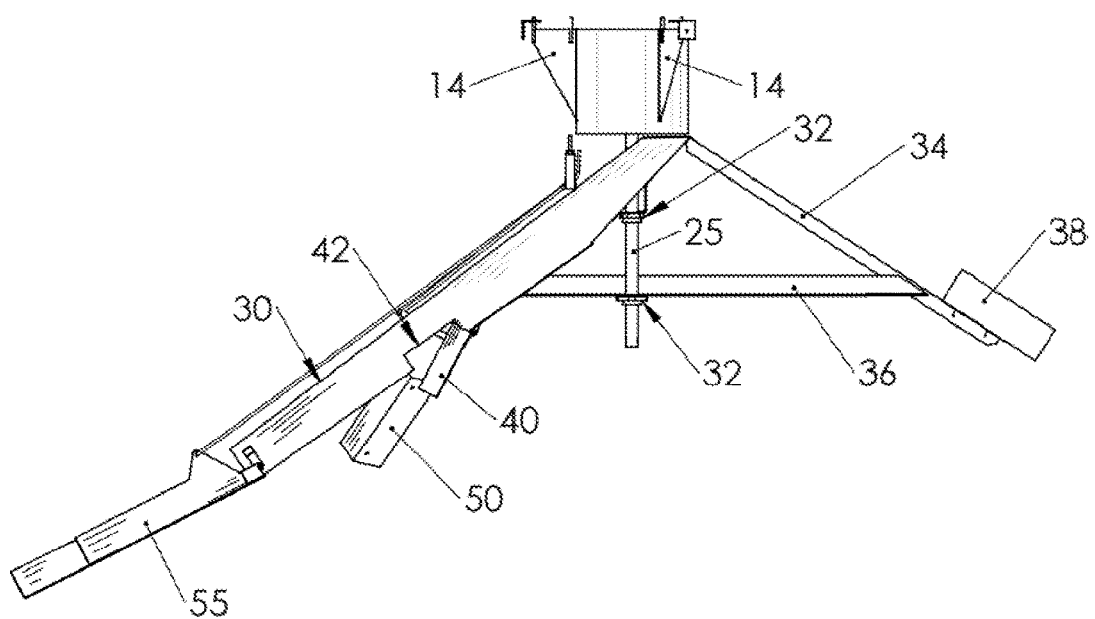
FIG. 2 is an enlarged side view of the spreader shown in FIG. 1, the opposite side view being a mirror image.
Figure 3:
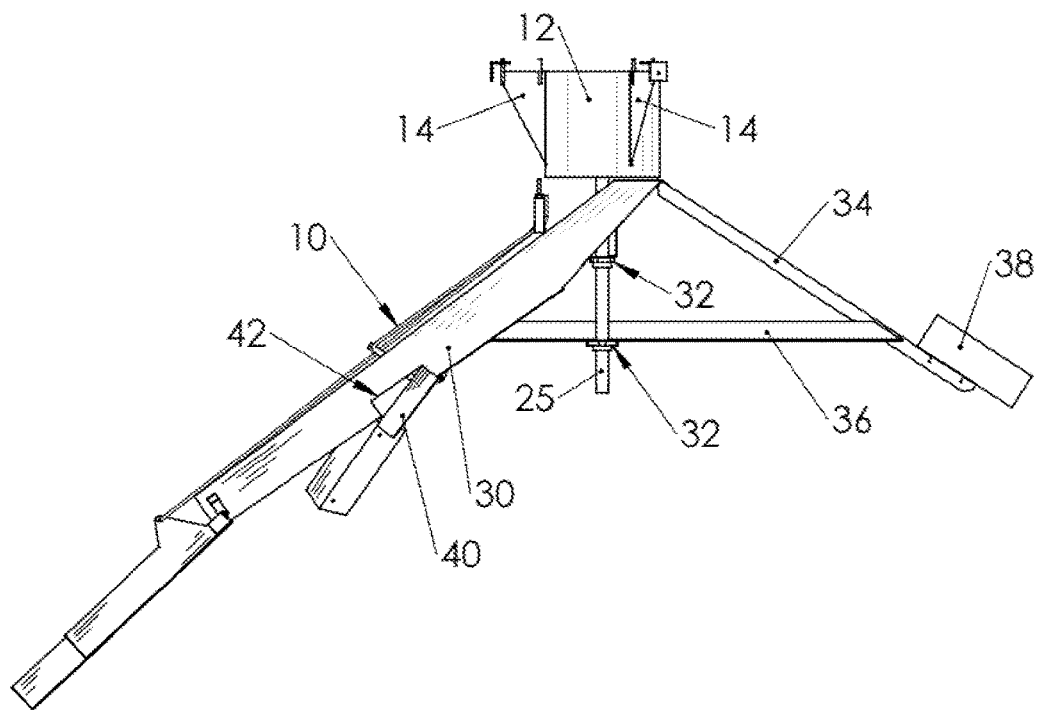
FIG. 3 is a side view thereof after a trap door and lower end portion of the chute have been lowered.

The self-rotating grain spreader 10 is constructed in accordance with an embodiment of the invention and provides all of the features mentioned above and is economical in construction and simple to install within the upper portion of a grain bin, through the top opening of the bin. The self-rotating grain spreader 10 includes an annular or cylindrical hopper 12 which is supported by brackets 14 connected to the top inlet portion 16 of an inclined top wall 18 of a grain bin 20. The hopper 12 supports a downwardly projecting tubular center shaft 25 having a vertical axis and which is non-rotatable. The shaft 25 projects downwardly from the hopper 12 and supports an elongated and inclined primary chute 30 having an upper end portion positioned to receive grain from the hopper 12. The chute extends downwardly at an angle of about 45 degrees relative to the center shaft 25 and is supported for rotation by vertically spaced bearings 32 mounted on the non-rotatable center shaft 25.

The primary chute 30 is supported on the incline by counter balancing arms 34 & 36 also supported by bearings 32 for rotation with the primary chute, and the arms carry a weight member 38. The primary grain chute 30 has a substantially V-shape cross-sectional configuration and extends upwardly to receive the grain supplied to the hopper 12 so that the grain slides downwardly within the primary chute to an outlet at the lower end of the chute.

A trap door 40 is supported for pivotal movement within a central portion of the primary chute and is pivotal between a closed position for an opening 42 within the bottom side portion of the chute to an open position to allow some of the grain sliding down the chute to flow out the bottom of the chute. The trap door 40 is operable or pivots by a mechanism 45 that has an element 46 connected by a lever 47 to the trap door, and the mechanism 45 can be adjusted or controlled from inside the hopper 12.

A grain deflector 50 is supported by the primary chute 30 and is positioned to rotate the chute 30 on the axis of the center shaft in response to the downward flow of grain through the trap door opening 42. Thus the rotation of the primary chute 30 is controlled by the flow of grain through the trap door opening 42. Thus the extent of the open position of the trap door controls the degree of rotation of the primary chute 30.

Figure 4:
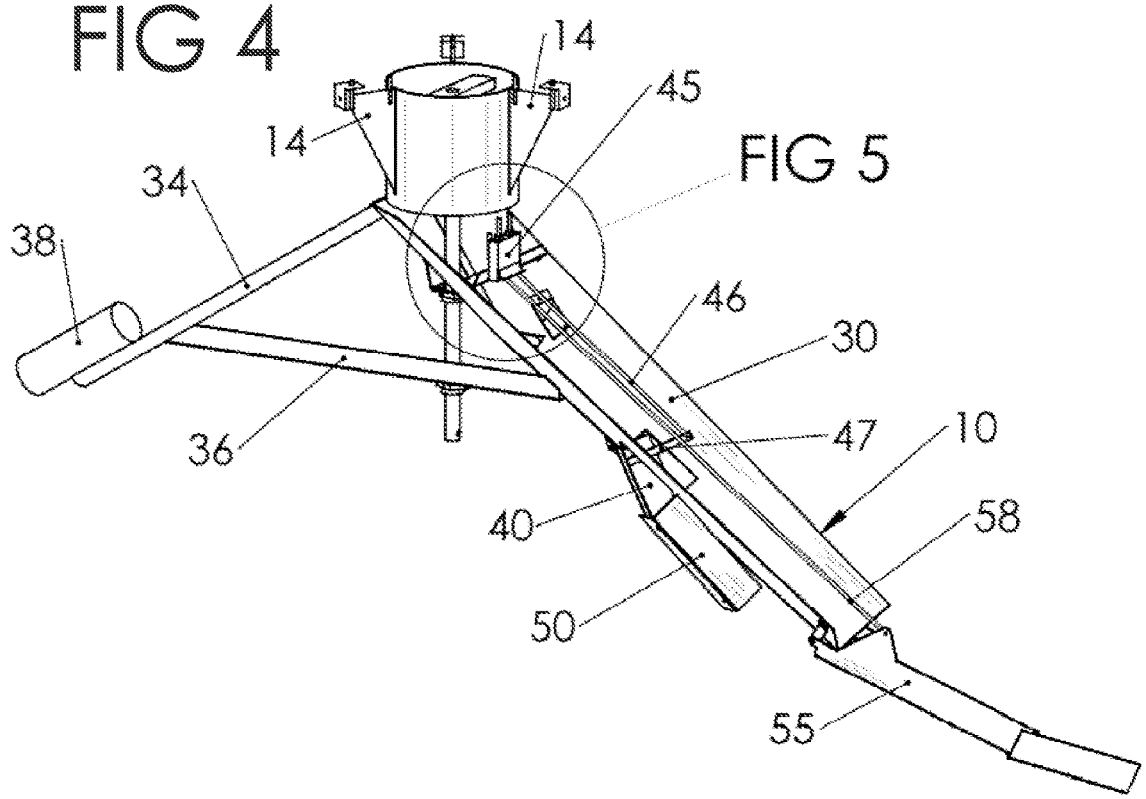
FIG. 4 is a perspective view of the primary chute and chute member and showing the adjustment mechanism for the trap door and lower chute member.
Figure 5:
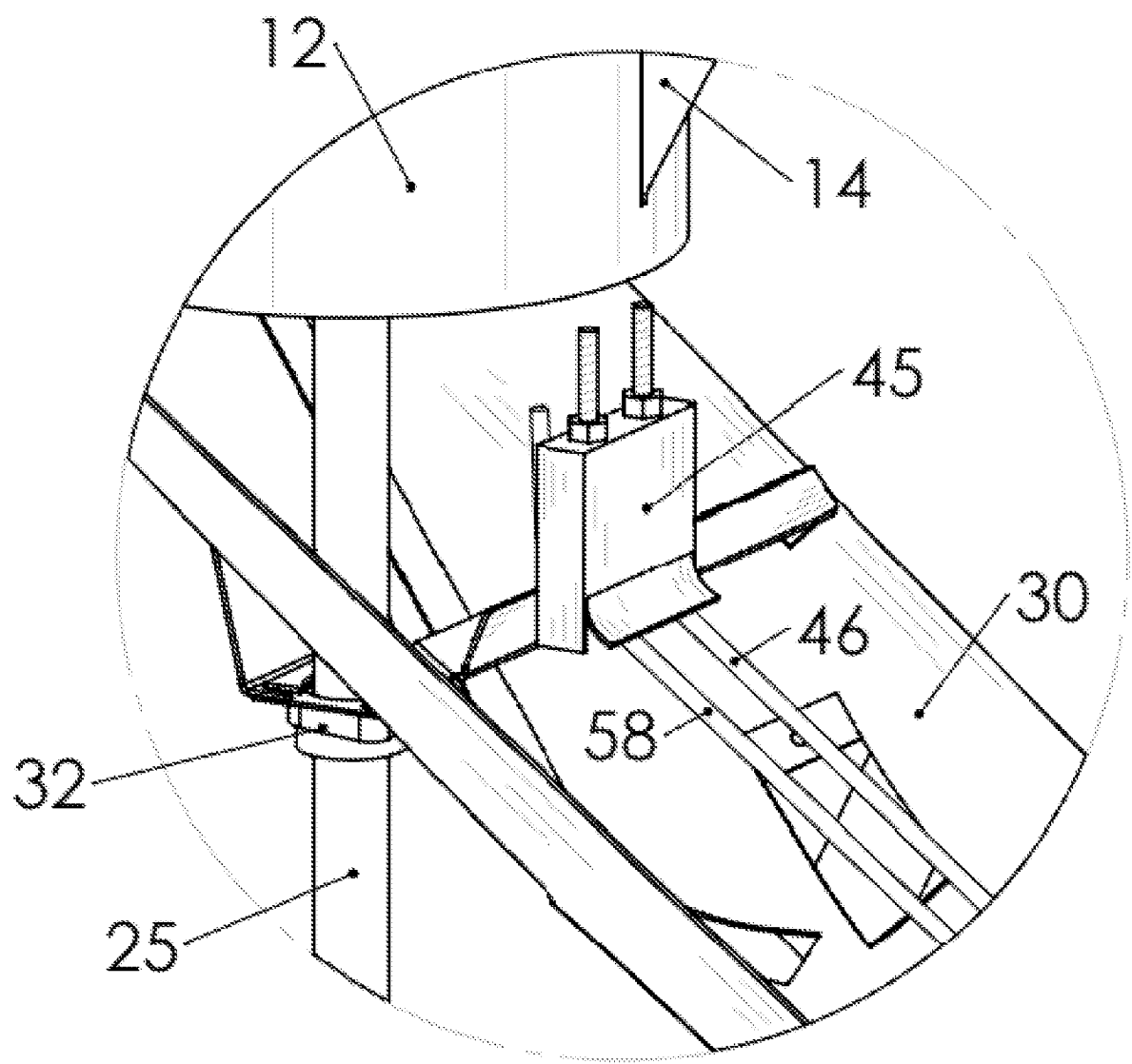
FIG. 5 is an enlarged view of the adjustment members shown in FIG. 4.
Figure 6:
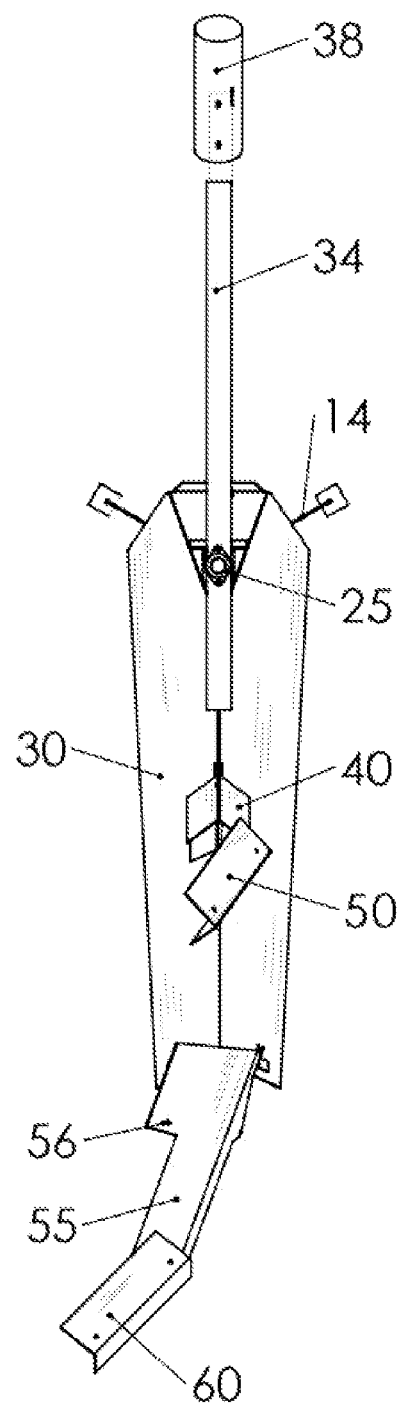
FIG. 6 is a bottom view of the primary chute and lower chute member.

As shown in FIGS. 4 and 6, the lower end portion of the primary chute 30 pivotally supports a lower chute member 55 for pivoting on a pin 56 and is substantially flat as shown in FIG. 6. The lower chute member 55 is pivoted by a rod 58 extending from the adjusting mechanism 45 which also controls the pivotal movement of the trap door 40. The lower chute member 55 has an adjustable deflector member 60 which extends at an angle to assist the rotation of the primary chute 30.

Figure 7:
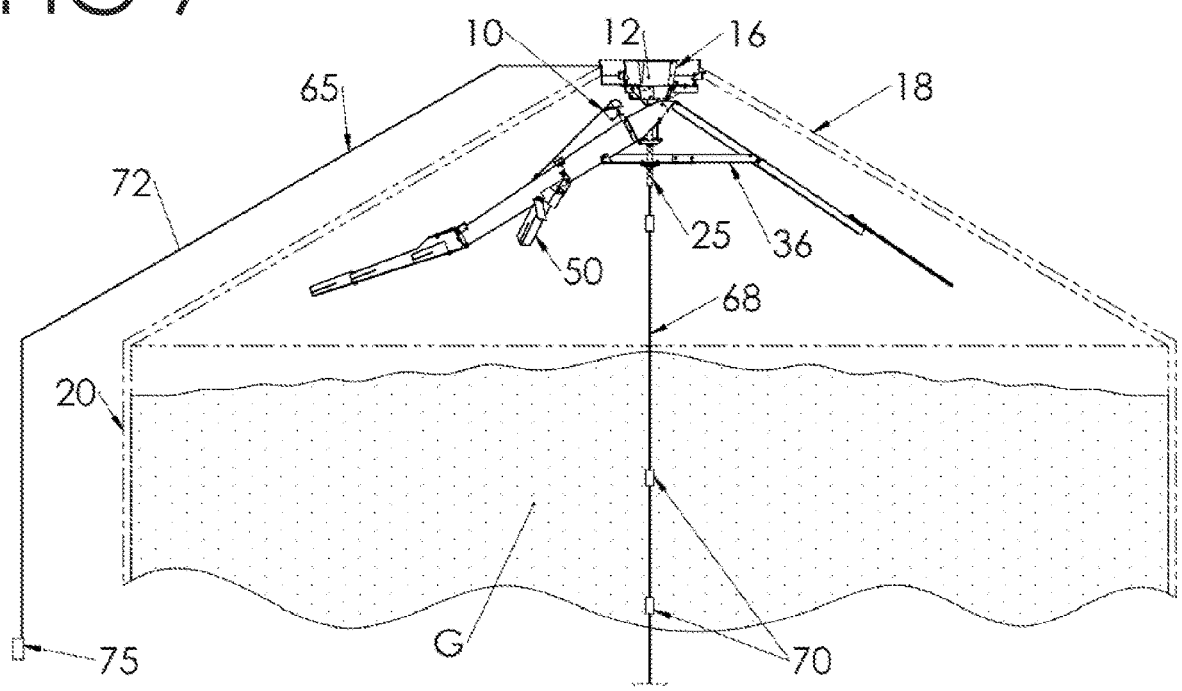
FIG. 7 is a grain spreader as shown in FIG. 1 in combination with a system for monitoring the temperature of the grain of within the center portion of the grain within a grain bin.

Referring to FIG. 7, the grain temperature and moisture content of the grain G spread into the grain bin 20 by the spreader 10 is monitored within the center portion of Grain G within the bin 20 by a temperature detecting and monitoring system 65 such as sold by Tri-States Grain Conditioning, Inc. (TSGC, Inc.) in West Spirit, IA, and Safe-Grain, Inc., in Loveland, OH, and disclosed, for example, in U.S. Pat. No. 10,990,771. The system 65 includes an electrical cable 68 which extends downwardly through the tubular center shaft 25 of the grain spreader 10 and into the center portion of the grain G in the bin. This portion of the cable 68 preferably carries a plurality of vertically spaced temperature and moisture sensing elements 70 of the type used in the products referred to above and in the '771 Patent, and are commercially available from these companies.

The cable 68 has a second or outer portion 72 which extends from the top of the center shaft 25 outside the grain bin 20 to a temperature monitoring device 75, also commercially available from the above mentioned companies. The device 75 detects and uses the temperature of the grain within the center portion of the grain bin for changing or controlling the flow of air blown into the bin, usually upwardly through a perforated false bottom floor in the bin to change the moisture content of the grain stored in the bin.

From the drawings and the above description, it is apparent that a grain spreader and grain temperature monitoring system constructed in accordance with the invention provides the desirable features and advantages referred to above. While the specific structure of the grain spreader and grain monitoring system constitutes a preferred embodiment of the invention, it is to be understood that the invention is not limited to the specific structure disclosed, and that changes may be made therein without departing from the scope of the invention as defined in the dependent claims. All of claims 1-7 include a grain spreader as disclosed in above design patent application identified in paragraph [0001].

What is claimed is:

1. A grain distributing and monitoring system comprising a grain bin,
   an annular hopper connected to an upper portion of the grain bin for directing grain downwardly into the bin
   a substantially vertical non-rotating tubular center shaft supported by the hopper and projecting downwardly from the hopper into the grain bin,
   a grain spreader supported for rotation by the center shaft within the upper portion of the grain bin,
   the grain spreader positioned to receive grain from the hopper and for spreading the grain downwardly and laterally into the grain bin,
   the grain spreader is self-rotating and includes an inclined elongated chute having a bottom opening,
   a movable trap door in the chute for controlling the flow of grain through the opening,
   a control member extending from the hopper to the trap door for adjusting the position of the trap door,
   an electrical cable extending downwardly through the tubular center shaft,
   the cable supporting at least one sensing element within the grain bin and adapted to detect the temperature and/or moisture of the grain within the grain bin, and
   a monitoring device connected to the cable and adapted to control the temperature and/or moisture of the grain in the bin.

2. The grain system of claim 1 wherein the cable includes a portion extending from a top portion of the center shaft outside the grain bin to the monitoring device.

3. The grain system of claim 1 wherein a plurality of the sensing elements are vertically spaced on the cable within the grain in the grain bin, and each of the sensing elements is electrically connected to the monitoring system to provide for controlling the temperature and/or moisture of the grain at different elevations in the grain bin.

* * * * *